(12) United States Patent
Cruz Garcia

(10) Patent No.: US 8,875,460 B2
(45) Date of Patent: Nov. 4, 2014

(54) DIRECT LAMINATED FLOOR

(75) Inventor: Eugenio Cruz Garcia, Gandia (ES)

(73) Assignee: Faus Group, Inc., Calhoun, GA (US)

( * ) Notice: Subject to any disclaimer, the term of this patent is extended or adjusted under 35 U.S.C. 154(b) by 0 days.

(21) Appl. No.: 10/758,001

(22) Filed: Jan. 16, 2004

(65) Prior Publication Data

US 2004/0144051 A1    Jul. 29, 2004

Related U.S. Application Data

(63) Continuation of application No. 10/127,602, filed on Apr. 23, 2002, now Pat. No. 6,688,061, which is a continuation of application No. 09/460,117, filed on Dec. 13, 1999, now Pat. No. 6,401,415.

(30) Foreign Application Priority Data

Nov. 5, 1999    (ES) ....................................... 9902432

(51) Int. Cl.
| | |
|---|---|
| *E04F 13/08* | (2006.01) |
| *B32B 23/08* | (2006.01) |
| *B44C 5/04* | (2006.01) |
| *B32B 23/02* | (2006.01) |
| *E04F 15/02* | (2006.01) |
| *E04F 15/10* | (2006.01) |
| *E04F 15/04* | (2006.01) |

(52) U.S. Cl.
CPC .............. *B44C 5/0492* (2013.01); *B32B 23/08* (2013.01); *B32B 23/02* (2013.01); *E04F 15/02* (2013.01); *E04F 15/10* (2013.01); *E04F 15/04* (2013.01); *B44C 5/0438* (2013.01); *E04F 15/02033* (2013.01)
USPC .............................................. 52/390; 52/316

(58) Field of Classification Search
USPC ................ 52/311.1, 313, 315, 316, 392, 390, 52/589.1, 591.1, 592.1, 796.1, 591, 1; 428/322.2, 535, 537.5, 50, 60
See application file for complete search history.

(56) References Cited

U.S. PATENT DOCUMENTS

| | | |
|---|---|---|
| D16,458 S | 1/1886 | Mankey |
| 669,445 A | 3/1901 | Morey |
| 800,655 A | 10/1905 | Kitsee |
| 813,641 A | 2/1906 | Gilbert |
| 1,479,647 A | 1/1924 | Carroll |
| RE16,473 E | 11/1926 | Humphreys |

(Continued)

FOREIGN PATENT DOCUMENTS

| | | |
|---|---|---|
| AU | 33432 | 8/1979 |
| AU | 519917 | 1/1982 |

(Continued)

OTHER PUBLICATIONS

"Surface Decoration of Artificial Board".

(Continued)

*Primary Examiner* — Jessica Laux
(74) *Attorney, Agent, or Firm* — Miller & Martin PLLC

(57) ABSTRACT

New direct laminated floor, of the kind that contain, on their surface, cellulose sheets impregnated in polymerizable resins, on which some characteristics have been drawn and where, once pressed and mechanised, the finished strips have an offset/sunk area on the peripheral edge and the optic/tactile texture of the surface corresponds and adapts to the characteristics drawn on the cellulose sheets.
For application in the construction industry.

9 Claims, 1 Drawing Sheet

(56) References Cited

U.S. PATENT DOCUMENTS

| | | | |
|---|---|---|---|
| 1,697,426 A | 1/1929 | Humphreys | |
| 1,825,877 A | 10/1931 | Loetscher | |
| 1,854,933 A | 4/1932 | Hartman et al. | |
| 2,027,292 A | 1/1936 | Rockwell | |
| 2,037,465 A | 4/1936 | Gibson et al. | |
| 2,046,593 A | 7/1936 | Urbain | |
| 2,054,458 A | 9/1936 | Arge et al. | |
| 2,057,135 A | 10/1936 | Cherry | |
| 2,063,935 A | 12/1936 | Kirschbraun | |
| 2,088,280 A | 7/1937 | Schillinger | |
| 2,108,226 A * | 2/1938 | Johnston | 404/42 |
| 2,137,238 A | 11/1938 | Collins | |
| 2,246,377 A | 6/1941 | Mattes | |
| 2,311,156 A | 2/1943 | Casto | |
| 2,491,498 A | 12/1949 | Gustaf | |
| 2,619,681 A | 12/1952 | Baker et al. | |
| 2,715,289 A | 8/1955 | Gale | |
| 3,002,309 A | 10/1961 | Snyder | |
| 3,025,626 A | 3/1962 | Schumacher | |
| 3,204,380 A | 9/1965 | Smith et al. | |
| 3,293,108 A | 12/1966 | Nairn et al. | |
| 3,345,234 A | 10/1967 | Jecker et al. | |
| 3,373,068 A | 3/1968 | Grosheim et al. | |
| 3,387,422 A | 6/1968 | Wanzer | |
| 3,411,977 A | 11/1968 | Slater, Jr. | |
| 3,414,194 A | 12/1968 | Seitzinger | |
| 3,421,277 A | 1/1969 | Frischmuth | |
| 3,459,400 A | 8/1969 | Rothermel | |
| 3,515,620 A | 6/1970 | Mcpherson | |
| 3,551,177 A | 12/1970 | Hechtman et al. | |
| 3,627,861 A | 12/1971 | Timke | |
| 3,648,358 A | 3/1972 | Cannady et al. | |
| 3,654,044 A | 4/1972 | Hirota | |
| 3,698,978 A | 10/1972 | McQuade | |
| 3,732,137 A | 5/1973 | Scher | |
| 3,740,914 A | 6/1973 | Diez | |
| 3,740,915 A | 6/1973 | Mollman | |
| 3,802,947 A | 4/1974 | McQuade, Jr. | |
| 3,808,024 A | 4/1974 | Witman | |
| 3,810,774 A | 5/1974 | Pittman | |
| 3,814,647 A | 6/1974 | Scher et al. | |
| 3,846,219 A | 11/1974 | Kunz | |
| 3,857,915 A | 12/1974 | Crowley | |
| 3,875,716 A | 4/1975 | Eusemann | |
| 3,878,030 A * | 4/1975 | Cook | 428/45 |
| 3,880,687 A | 4/1975 | Elmendorf et al. | |
| 3,912,569 A | 10/1975 | Kapral | |
| 3,997,696 A | 12/1976 | Jaisle et al. | |
| 4,008,551 A * | 2/1977 | MacDonald et al. | 52/316 |
| 4,062,992 A | 12/1977 | Power et al. | |
| 4,092,198 A | 5/1978 | Scher et al. | |
| 4,092,199 A | 5/1978 | Ungar et al. | |
| 4,093,766 A | 6/1978 | Scher et al. | |
| 4,118,533 A | 10/1978 | Hipchen et al. | |
| 4,126,727 A | 11/1978 | Kaminski | |
| 4,131,705 A | 12/1978 | Kubinsky | |
| 4,154,882 A | 5/1979 | Scher et al. | |
| 4,163,818 A | 8/1979 | Wernli | |
| 4,210,693 A | 7/1980 | McCann et al. | |
| 4,239,797 A | 12/1980 | Sachs | |
| 4,241,554 A | 12/1980 | Infantino | |
| 4,243,367 A | 1/1981 | Renoux | |
| 4,248,922 A | 2/1981 | Shortway et al. | |
| 4,284,453 A | 8/1981 | Endrizzi | |
| 4,290,248 A * | 9/1981 | Kemerer et al. | 52/309.16 |
| 4,299,069 A | 11/1981 | Neumann | |
| 4,367,110 A | 1/1983 | Yoshikawa | |
| 4,374,886 A | 2/1983 | Raghava | |
| 4,376,812 A | 3/1983 | West | |
| 4,396,448 A | 8/1983 | Ohta et al. | |
| 4,409,280 A | 10/1983 | Wiley et al. | |
| 4,420,351 A | 12/1983 | Lussi et al. | |
| D273,527 S | 4/1984 | Pota | |
| 4,490,503 A | 12/1984 | Goring | |
| 4,500,373 A | 2/1985 | Kubota | |
| 4,517,236 A | 5/1985 | Meeker et al. | |
| 4,546,025 A | 10/1985 | Vaisman | |
| 4,557,779 A | 12/1985 | Bower et al. | |
| 4,579,767 A | 4/1986 | Coggan et al. | |
| 4,581,255 A | 4/1986 | Coggan et al. | |
| 4,585,685 A | 4/1986 | Forry et al. | |
| 4,599,127 A | 7/1986 | Cannady, Jr. et al. | |
| 4,625,491 A | 12/1986 | Gibson | |
| 4,689,102 A | 8/1987 | Prawdzik et al. | |
| 4,693,924 A | 9/1987 | Kuper et al. | |
| 592,373 A | 10/1987 | Kellogg | |
| 4,702,870 A | 10/1987 | Setterholm | |
| 4,791,015 A | 12/1988 | Becker et al. | |
| 4,816,319 A | 3/1989 | Dees, Jr. et al. | |
| 4,844,849 A | 7/1989 | Miller et al. | |
| 4,860,506 A | 8/1989 | Yoshimi et al. | |
| 4,864,790 A * | 9/1989 | Liardet | 52/311.2 |
| 4,940,503 A | 7/1990 | Lindgren et al. | |
| 4,950,500 A | 8/1990 | Kauffman et al. | |
| 5,011,411 A | 4/1991 | Loewy et al. | |
| 5,034,272 A * | 7/1991 | Lindgren et al. | 428/331 |
| 5,053,274 A | 10/1991 | Jonas | |
| 5,112,671 A | 5/1992 | Diamond et al. | |
| 5,113,632 A | 5/1992 | Hanson | |
| 5,136,823 A | 8/1992 | Pellegrino | |
| 5,167,991 A | 12/1992 | Lowe | |
| 5,226,273 A * | 7/1993 | Burke | 52/390 |
| 5,283,102 A | 2/1994 | Sweet et al. | |
| 5,295,341 A | 3/1994 | Kajiwara | |
| 5,304,272 A | 4/1994 | Rohrbacker et al. | |
| 5,314,554 A * | 5/1994 | Owens | 156/154 |
| 5,335,473 A | 8/1994 | Chase | |
| 5,391,340 A | 2/1995 | Mirous et al. | |
| 5,413,834 A | 5/1995 | Hunter et al. | |
| 5,425,986 A | 6/1995 | Guyette | |
| 5,437,934 A | 8/1995 | Witt et al. | |
| 5,468,323 A | 11/1995 | McNeil | |
| 5,487,217 A | 1/1996 | Richardson et al. | |
| 5,496,129 A | 3/1996 | Dube | |
| 5,525,394 A | 6/1996 | Clark et al. | |
| D373,203 S | 8/1996 | Kornfalt et al. | |
| 5,554,429 A | 9/1996 | Iwata et al. | |
| 5,558,933 A | 9/1996 | Anthony | |
| 5,570,554 A | 11/1996 | Searer | |
| 5,587,218 A | 12/1996 | Betz | |
| 5,630,304 A | 5/1997 | Austin | |
| 5,637,236 A | 6/1997 | Lowe | |
| 5,681,428 A | 10/1997 | Nakajima et al. | |
| 5,713,173 A * | 2/1998 | Von Langsdorff et al. | 52/311.2 |
| 5,723,221 A | 3/1998 | Brooker et al. | |
| 5,736,227 A * | 4/1998 | Sweet et al. | 428/192 |
| 5,744,220 A | 4/1998 | Ringö | |
| 5,755,068 A | 5/1998 | Ormiston | |
| 5,766,752 A * | 6/1998 | Cox et al. | 428/322.2 |
| 5,815,995 A | 10/1998 | Adam | |
| 5,830,529 A | 11/1998 | Ross | |
| 5,853,637 A * | 12/1998 | Bryant | 264/132 |
| 5,858,160 A * | 1/1999 | Piacente et al. | 156/279 |
| 5,862,643 A | 1/1999 | Schilham | |
| 5,884,445 A | 3/1999 | Woolfard | |
| 5,894,700 A | 4/1999 | Sweet | |
| 5,961,903 A | 10/1999 | Eby et al. | |
| 5,985,397 A | 11/1999 | Witt et al. | |
| 5,992,106 A | 11/1999 | Carling et al. | |
| 6,032,425 A | 3/2000 | Gugliotti et al. | |
| 6,099,782 A | 8/2000 | Holmes | |
| 6,101,778 A | 8/2000 | Martensson | |
| 6,103,352 A | 8/2000 | Takahashi | |
| 6,114,008 A * | 9/2000 | Eby et al. | 428/151 |
| 6,131,355 A | 10/2000 | Groh et al. | |
| 6,134,854 A | 10/2000 | Stanchfield | |
| 6,146,252 A * | 11/2000 | Martensson | 451/44 |
| 6,156,402 A | 12/2000 | Smith | |
| 6,182,410 B1 | 2/2001 | Pervan | |
| 6,182,413 B1 | 2/2001 | Magnusson | |
| 6,189,283 B1 | 2/2001 | Bentley et al. | |
| 6,224,698 B1 | 5/2001 | Endo | |
| 6,247,285 B1 | 6/2001 | Moebus | |
| 6,300,279 B1 | 10/2001 | Macedo | |

(56) References Cited

U.S. PATENT DOCUMENTS

| | | | |
|---|---|---|---|
| 6,375,777 B1 | 4/2002 | Sjölin et al. | |
| 6,401,415 B1 * | 6/2002 | Garcia | 52/311.1 |
| 6,418,683 B1 | 7/2002 | Martensson et al. | |
| 6,421,970 B1 | 7/2002 | Martensson et al. | |
| 6,449,913 B1 | 9/2002 | Shelton | |
| 6,460,306 B1 | 10/2002 | Nelson | |
| 6,465,046 B1 | 10/2002 | Hansson et al. | |
| 6,494,982 B1 | 12/2002 | Mueller et al. | |
| 6,519,912 B1 | 2/2003 | Eckmann et al. | |
| 6,551,678 B1 | 4/2003 | O'Brien et al. | |
| 6,558,163 B2 | 5/2003 | Riitano | |
| 6,558,754 B1 | 5/2003 | Velin et al. | |
| 6,565,919 B1 | 5/2003 | Hansson et al. | |
| 6,588,163 B2 * | 7/2003 | Wang et al. | 52/316 |
| 6,617,009 B1 | 9/2003 | Chen et al. | |
| 6,627,029 B1 | 9/2003 | Mueller et al. | |
| 6,638,387 B2 | 10/2003 | Cruz | |
| 6,688,061 B2 * | 2/2004 | Garcia | 52/311.1 |
| 6,691,480 B2 * | 2/2004 | Garcia | 52/313 |
| 6,709,764 B1 * | 3/2004 | Perrin et al. | 428/537.5 |
| 6,786,019 B2 | 9/2004 | Thiers | |
| 6,805,951 B2 | 10/2004 | Kornfalt et al. | |
| 6,860,074 B2 | 3/2005 | Stanchfield | |
| D504,181 S | 4/2005 | Stanchfield | |
| 6,874,292 B2 | 4/2005 | Moriau et al. | |
| D504,730 S | 5/2005 | Kornfalt et al. | |
| D504,731 S | 5/2005 | Stanchfield | |
| 6,898,911 B2 | 5/2005 | Kornfalt et al. | |
| 7,243,469 B2 | 7/2007 | Miller et al. | |
| 7,249,445 B2 | 7/2007 | Theirs | |
| 7,836,648 B2 | 11/2010 | Garcia et al. | |
| 2001/0034992 A1 | 11/2001 | Pletzer et al. | |
| 2002/0001407 A1 | 1/2002 | Uchida | |
| 2002/0046526 A1 | 4/2002 | Knauseder | |
| 2002/0046527 A1 | 4/2002 | Nelson | |
| 2002/0046528 A1 | 4/2002 | Pervan et al. | |
| 2002/0046542 A1 | 4/2002 | Tychsen | |
| 2002/0056245 A1 | 5/2002 | Thiers | |
| 2002/0059765 A1 | 5/2002 | Nogueira et al. | |
| 2002/0100231 A1 | 8/2002 | Miller et al. | |
| 2002/0100242 A1 | 8/2002 | Olofsson | |
| 2002/0110669 A1 | 8/2002 | Garcia | |
| 2002/0160680 A1 | 10/2002 | Laurence et al. | |
| 2003/0108717 A1 | 6/2003 | Sjoberg et al. | |
| 2003/0159389 A1 | 8/2003 | Kornfalt et al. | |
| 2003/0167717 A1 | 9/2003 | Garcia | |
| 2003/0205012 A1 | 11/2003 | Garcia | |
| 2003/0208860 A1 | 11/2003 | Miller et al. | |
| 2004/0074191 A1 | 4/2004 | Garcia | |
| 2006/0191222 A1 | 8/2006 | Sabater et al. | |
| 2006/0201093 A1 | 9/2006 | Stanchfield | |
| 2006/0260241 A1 | 11/2006 | Stanchfield | |

FOREIGN PATENT DOCUMENTS

| | | | |
|---|---|---|---|
| BE | 896349 | 8/1983 | |
| CH | 645 301 | 9/1994 | |
| CN | 1068775 | 2/1993 | |
| CN | 1086282 | 5/1994 | |
| CN | 1093657 | 10/1994 | |
| CN | 2178751 | 10/1994 | |
| CN | 1111316 | 11/1995 | |
| CN | 1124814 | 6/1996 | |
| CN | 1139143 | 1/1997 | |
| CN | 1140646 | 1/1997 | |
| CN | 1161013 | 10/1997 | |
| CN | 2276875 | 3/1998 | |
| CN | 2312287 | 3/1999 | |
| CN | 2323056 | 6/1999 | |
| CN | 1223931 | 7/1999 | |
| CN | 1240167 | 1/2000 | |
| CN | 1256200 | 6/2000 | |
| CN | 1278484 | 1/2001 | |
| CN | 1282654 | 2/2001 | |
| CN | 1285449 | 2/2001 | |
| CN | 2428285 | 5/2001 | |
| CN | 1376230 | 10/2002 | |
| CN | 1426880 | 7/2003 | |
| CN | 1737295 | 2/2006 | |
| CN | 2834942 | 11/2006 | |
| DE | 21 11 772 | 9/1971 | |
| DE | 02 239 352 | 2/1974 | |
| DE | 26 57 809 A1 | 6/1978 | |
| DE | 2752864 | 5/1979 | |
| DE | 32 19 508 | 12/1983 | |
| DE | 3219508 | 12/1983 | |
| DE | 33 28 528 | 6/1985 | |
| DE | 36 34 764 | 4/1988 | |
| DE | 196 10 669 | 3/1997 | |
| DE | 199 01 377 | 7/2000 | |
| DE | 200 08 837 | 8/2000 | |
| DE | 201 00 320 | 4/2001 | |
| DE | 203 00 412 | 3/2003 | |
| DE | 102 04 154 | 8/2003 | |
| DE | 203 11 569 | 10/2003 | |
| EP | 0 461 758 | 12/1991 | |
| EP | 0 592 573 B1 | 9/1996 | |
| EP | 1 795 339 | 11/1999 | |
| EP | 1 795 340 | 11/1999 | |
| EP | 0 788 576 | 9/2000 | |
| EP | 0 813 641 B1 | 7/2001 | |
| EP | 1 153 736 A1 | 11/2001 | |
| EP | 0 888 215 B1 | 6/2002 | |
| EP | 0 888 215 B1 | 6/2002 | |
| EP | 1 225 033 A1 | 7/2002 | |
| EP | 1 225 033 A1 | 7/2002 | |
| EP | 1 229 183 | 8/2002 | |
| EP | 0 883 487 B1 | 10/2002 | |
| EP | 0 883 487 B1 | 10/2002 | |
| EP | 1 153 736 B1 | 11/2004 | |
| ES | 163421 U | 5/1971 | |
| ES | 460194 A | 5/1978 | |
| ES | 283331 U | 5/1985 | |
| ES | 2933331 | 5/1985 | |
| ES | 1019585 U | 4/1992 | |
| FR | 571542 | 5/1924 | |
| FR | 976356 | 3/1951 | |
| FR | 1 293 043 | 5/1962 | |
| FR | 1 354 755 | 6/1964 | |
| FR | 1489710 | * 6/1967 | 52/592.1 |
| FR | 1 489 710 | 7/1967 | |
| FR | 2 409 867 | 6/1979 | |
| FR | 2 530 274 | 1/1984 | |
| FR | 2 536 337 | 5/1984 | |
| GB | 1202324 | 8/1970 | |
| GB | 1 215 971 | 12/1970 | |
| GB | 1 262 850 | 2/1972 | |
| GB | 2 054 458 | 2/1981 | |
| GB | 1 590 540 | 6/1981 | |
| GB | 2 088 280 | 6/1982 | |
| GB | 2 145 421 | 3/1985 | |
| GB | 2 345 269 | 7/2000 | |
| JP | 52-042572 | 4/1977 | |
| JP | 54-65528 | 5/1979 | |
| JP | 55-100154 | 7/1980 | |
| JP | 63-040055 | 2/1988 | |
| JP | 01-010847 | 1/1989 | |
| JP | 1-087315 | 3/1989 | |
| JP | 2-143846 | 6/1990 | |
| JP | 3-028257 | 2/1991 | |
| JP | 4-24935 | 2/1992 | |
| JP | 6-010482 | 1/1994 | |
| JP | 6-508897 | 10/1994 | |
| JP | 7-88992 | 4/1995 | |
| JP | 7-266305 | 10/1995 | |
| JP | 9-011259 | 1/1997 | |
| JP | H-10-183964 | 7/1998 | |
| JP | 2000-265652 | 9/2000 | |
| JP | 2004-84285 | 3/2004 | |
| JP | 2004-225456 | 8/2004 | |
| JP | 2005-503502 | 2/2005 | |
| JP | 2005-523394 | 8/2005 | |
| KR | 10-0430315 | 5/1999 | |

(56) References Cited

FOREIGN PATENT DOCUMENTS

| | | |
|---|---|---|
| RU | 2077640 | 4/1997 |
| RU | 2123094 | 12/1998 |
| RU | 21785 | 2/2002 |
| SU | 896216 | 1/1982 |
| SU | 1271955 | 11/1986 |
| SU | 1716040 | 2/1992 |
| SU | 1716041 | 2/1992 |
| WO | WO 91/06427 | 5/1991 |
| WO | WO 94/26999 | 11/1994 |
| WO | WO 97/19232 | 5/1997 |
| WO | WO 97/31176 | 8/1997 |
| WO | 97/31776 A1 | 9/1997 |
| WO | WO 97/31775 | 9/1997 |
| WO | WO 97/31776 | 9/1997 |
| WO | WO-97/31776 A1 | 9/1997 |
| WO | WO 97/47834 | 12/1997 |
| WO | WO 02/058924 | 8/2002 |
| WO | WO 03/006232 | 1/2003 |
| WO | WO 03/047858 | 6/2003 |
| WO | WO 03/078761 A1 | 9/2003 |

OTHER PUBLICATIONS

"The Practical Manual for Intensified Wood Floor Board".
"Resin Impregnated Paper for Overlaying".
Notice of Opposition to European Application No. 99958193.7, reference No. EPA-88398, Apr. 28, 2008, pp. 1-57.
*Faus Group Inc. and Industrias Auxiliares Faus. S.L. v. Berry Floor N.V., Berry Finance N.V., Alloc Inc., and Beaulieu International Group N.V.*, 1:08-cv-00315-TWT, Defendants' Opening Claim Construction Brief filed in N.D. Ga. on Dec. 11, 2008, pp. 1-45, Exhibits 1-5.
*Faus Group Inc. and Industrias Auxiliares Faus, S.L. v. Berry Floor N.V., Berry Finance N.V., Alloc Inc., and Beaulieu International Group N.V.*, 1:08-cv-00315-TWT, Memorandum in Support of their Proposed Claim Constructions filed in N.D. Ga. Dec. 11, 2008, pp. 1-47.
*Faus Group Inc. and Industrias Auxiliares Faus, S.L. v. Berry Floor N.V., Berry Finance N.V., Alloc Inc., and Beaulieu International Group N.V.*, 1:08-cv-00315-TWT, Declaration of Matthew T. Bailey in Support of Plaintiffs Faus Group, Inc. and Industrias Auxiliares Faus S.L.'s Memorandum in Support of their Proposed Claim Constructions, filed in N.D. Ga. Dec. 11, 2008, pp. 1-9, Exhibits 1-14.
Letter from Paul Oakley to Tarkett Distributor Sales Representatives; "Ceramique Tile Introduction", Jul. 29, 1999, three pages.
Letter from Paul Oakley to Tarkett Distributor Sales Representatives; "Ceramique Tile Introduction", Jul. 29, 1999, one page.

* cited by examiner

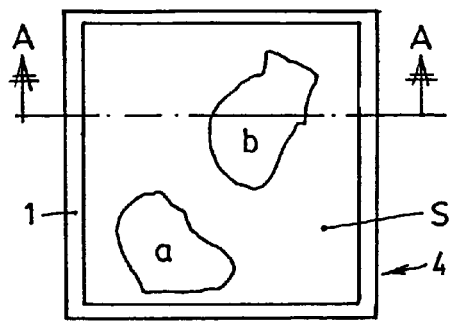
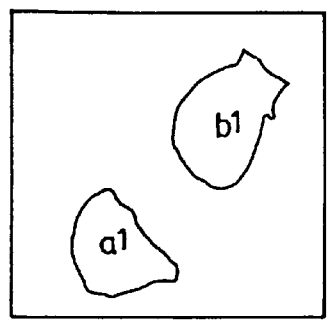
Fig. 2          Fig. 1
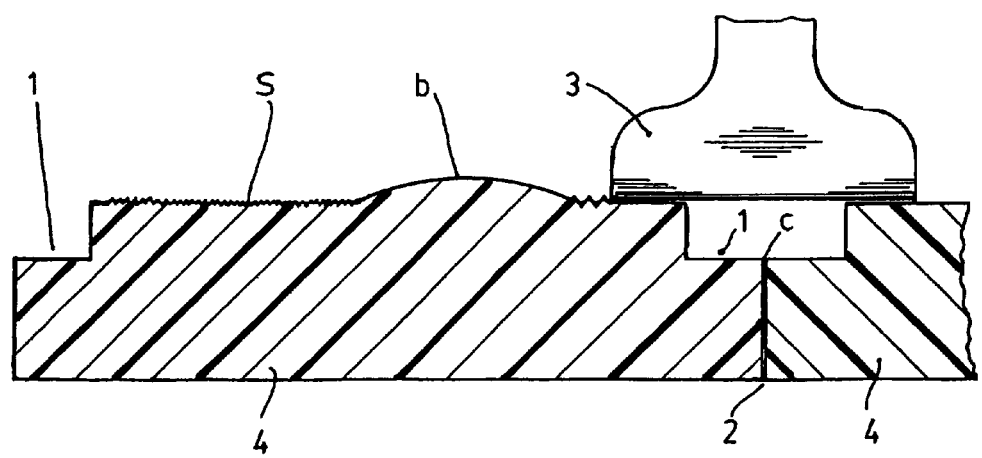
Fig. 3

DIRECT LAMINATED FLOOR

This application is a Continuation of application Ser. No. 10/127,602 filed on Apr. 23, 2002, now U.S. Pat. No. 6,688,061 which is a continuation of Ser. No. 09/460,117 filed on Dec. 13, 1999, now U.S. Pat. No. 6,401,415, which claims priority of Spanish Patent Application No. P-9902432 filed Nov. 5, 1999, which are hereby incorporated by reference as if fully set forth herein.

BACKGROUND OF THE INVENTION

It is well known to hot press cellulose sheets (papers) impregnated in phenol or melamine (or similar-resins) with wooden boards or panels (plus other components specified by the manufacturer) to produce products such as boards, laminated boards, panels, and direct laminated floors that imitate wood, ceramic, and natural stone. Such imitation materials are mainly used for floors.

If melamine is used, and if the product is to have a single work surface (for example a floor), the melaminized board that comes from the press typically has a surface area between 3 and 8 square meters. Such boards are then cut into units (strips) approximately 1,200×200 mm. Each unit is beneficially tongued and grooved for ready installation. The result is a decorative and resistant paving that imitates wood, ceramic or natural stone.

Such known products have two significant defects:
1.—They are not very wear resistant.
2.—They do not closely imitate natural products (such as ceramic and wood).

The applicant has investigated reason why such products are not very wear resistant. It has been observed that premature aging (wear) begins at or near the perimeter edges and/or along tongue and groove lines.

The known products have an even (level) surface texture such that the user such as a pedestrian, treads (the soles of his shoes make contact) equally on the center of a tile on its perimeter edge. But, since the perimeter edge is the weakest area it deteriorates first.

The applicant has also investigated the reason for the second defect. He has reached the conclusion that if an imitation product is not a suitable imitation of a natural product, it is at least partially because the imitation's surface texture, both optical and tactile, have design errors.

In current products, a decorative surface effect is achieved by a design that is printed on an impregnated (by resin) paper. However, the surface texture of products with such printed designs is typically monotonous (flat) over the whole surface. This is because the press mold produces a flat surface.

Thus, while a surface design represents the different characteristics (line, color) of a natural product, the texture (relief) provided by the press mold does not match a natural product's surface level variations, both with regard to sight and to touch.

SUMMARY OF THE INVENTION

One object of the invention is to overcome the wear problem of products (tile, strip, board, etc.), which typically have a polygonal shape such as a rectangle or square. The object is achieved by providing a relieved perimeter. That is, a product's perimeter edge is contoured to be a few tenths of a millimeter below the rest of the product's surface. Thus, when a user treads on the product the user's soles do not rest on the perimeter edges. Likewise friction or wear caused by other agents coming into contact with the product is avoided.

Another object of this invention is to overcome the problem wherein a product's surface (such as that of a tile, a strip, or a board) is totally even or monotonous. This object is achieved by producing a product having a surface texture that corresponds and adapts to a printed design. The result is close optical and textural identifications with a natural product.

That is if, for example, a wood knot appears in a design the final product is adapted to that design by providing an area having a volumetric, conceptual, and physical correspondence, both visual and textual, with a wood knot. A similar thing happens if there is a wood pore, a stone roughness, or bubbles on a ceramic.

The foregoing is achieved using an exact correspondence-concordance between the image on the impregnated papers and the relief texture of a press mold.

Example a).—Ceramic tiles in which the unions (joints) between tiles are relieved to produce a paving of earthenware ceramics;

b).—Wood designs where the streaks, pores, and knots of a paper design coincide with the surface texture.

In short, products with a very marked surface texture that adapts and corresponds to the design on a resin impregnated paper. What is achieved is a more realistic affect than when the surface texture does not adapt and correspond to the design on a resin impregnated paper. Not only is an optical effect created, but also the different reliefs, which appear in the correct areas, can be touched.

Also, the product's life increases as relieved joints do not undergo wear. This is because the relieved joints are not contacted when being trod upon.

This invention advocates new direct laminated flooring of cellulose sheets impregnated with polymerizable resins and having design characteristics, and that, once pressed, have offset/sunk areas in peripheral edges.

This invention is also characterized because the optical/tactile texture of the surface of the floor, once pressed, corresponds and adapts to the characteristics designed or cellulose sheets.

BRIEF DESCRIPTION OF THE DRAWINGS

To understand this invention better, a preferential way of practical execution is illustrated on the drawings, which are subject to accessory changes that take nothing away from their basic content.

FIG. 1 is a plan view of a design on a resin-impregnated paper before a product with that design is pressed and cut.

FIG. 2 is a plan view of a product that uses the resin-impregnated paper of FIG. 1, after that product is pressed.

FIG. 3 is a cross-sectional view taken along line A-A of FIG. 2.

DETAILED DESCRIPTION OF THE ILLUSTRATED EMBODIMENTS

An example of a practical execution of this invention, but not a limiting one, is described below.

This type of product usually has cellulose cores impregnated by polymerizable resins (such as phenols), in particular by melamine. The core may include wooden sheets or other products, such as silica, that resist abrasion.

A product has a rim area, as illustrated in FIG. 1, which may be a different color than the remainder of the product. The rim gives rise to a relieved perimeter rim 1 after pressing (see FIG. 2).

Turning now to FIG. 2, the pressed product unit 4, which is to be used in a paving, has a perimeter rim 1 that is sunk below the rest of the surface S of the product unit. The perimeter rim 1 forms a joint 2 as shown in FIG. 3. The joint 2 can be formed using numerous procedures, for example, tongue and groove.

The (mechanized) cutting, or quartering, of the first board is performed by a press and can be done in units (strips) of, for example, 300×300 mm, or 400×400 mm, or 600×600 mm. Several units can be maintained together in blocks of, for example, 1,200×300 mm (four units) or 1,200×400 mm (three units).

According to the principles of the present invention, the pressed board attempts to imitate another product. In the illustrated embodiment the product unit 4 imitates a ceramic, thus two deformities (a) and (b) that are similar to those of a ceramic are produced. It should be understood that the deformities extend normal to the surface of the product unit 4.

As ceramic tiles are usually butt joined with a small layer of cement, it will be seen that the perimeter rim 1 successfully imitates that of a ceramic tile, both by touch and sight. This is due to its offset, and possibly by adding a cement color to the design of the cellulose papers (of FIG. 1).

Turning now to FIG. 3, if a user treads between product unit 4 tiles the sole 3 of the user's shoe never reaches the perimeter edge (c).

It can be seen that once the characteristics ($a_1$) and ($b_1$) of the product to be imitated (ceramic) have been defined in the design drawing of a paper (FIG. 1), the volume-relief-texture (deformities) in the end product at (a) and (b), reference FIG. 2 correspond perfectly with respect to the position, concept, physical aspects, and volume to the design drawing characteristics ($a_1$) and ($b_1$) of the product to be imitated.

In the specific case of the perimeter rim 1, those of a ceramic tile can be considered.

Further mechanizing (working) of the product (flooring) that comes from the press usually includes dividing it into units (strips) that are to be placed on a floor, and in providing the units (if necessary) with connection means, for example, tongue and groove features.

This mechanizing is not the object of the invention.

The invention claimed is:

1. A laminated floor board comprising a plurality of laminate layers including at least one cellulose sheet impregnated with a resin, said laminated floor board having a fiberboard core, wherein the laminated floor board includes a surface, the laminated floor board having both a perimeter area having an edge contour and an interior region, wherein the perimeter area is relieved such that at least a portion of the edge contour is below the interior region, wherein the interior region has a surface texture that varies in accordance with a visual pattern printed on the at least one cellulose sheet, wherein the visual pattern imitates another product and wherein all laminate layers in the interior region extend to and are included in the edge contour, wherein the portion of the edge contour below the interior region includes all laminate layers and a combined thickness of all laminate layers in the edge contour is less than a combined thickness of all laminate layers in the interior region.

2. A laminated floor board according to claim 1, wherein the edge contour has a substantially linear shape from the interior region to the edge contour region.

3. The laminated floor board according to claim 1, further comprising connection means.

4. The laminated product according to claim 3, wherein the connection means is tongue and groove.

5. A laminated product that has been mechanically pressed to form individual units thereof, each individual unit including a plurality of laminate layers including at least one cellulose sheet and including a surface having an interior region and an edge contour region, wherein at least a portion of the edge contour region is below the interior region, wherein the interior region has a surface texture that varies in accordance with a visual pattern on the at least one cellulose sheet, wherein the visual pattern imitates another product and wherein all laminate layers in the interior region extend to and are included in the edge contour and wherein the portion of the edge contour below the interior region includes all laminate layers and a combined thickness of all laminate layers in the edge contour is less than a combined thickness of all laminate layers in the interior region.

6. A laminated product according to claim 5, wherein the edge contour region has a substantially linear shape from the interior region to the edge contour region.

7. The laminated product according to claim 5, further comprising a connection means.

8. The laminated product according to claim 7, wherein the connection means is tongue and groove.

9. A laminated floor board, comprising;
a fiberboard having a predetermined area between side edges of said fiberboard core;
a plurality of compressed cellulose sheets over said fiberboard core, said compressed cellulose sheets including at least one resin-impregnated cellulose sheet having a visual design and covering an entirety of said predetermined area;
a perimeter region defined at a periphery of said predetermined area an upper surface of said compressed cellulose sheets being lower in the perimeter region than an upper surface of said compressed cellulose sheets in a majority of a remainder of the predetermined area; and
depressed deformities extending from the upper surface of said compressed cellulose sheets in the majority of the remainder of the predetermined area, said depressed deformities corresponding with a visual design.

* * * * *